US011689100B2

(12) United States Patent
Kabir et al.

(10) Patent No.: US 11,689,100 B2
(45) Date of Patent: Jun. 27, 2023

(54) HIGH-VOLTAGE CHARGE PUMP USING LOW-VOLTAGE TECHNOLOGY

(71) Applicant: NXP USA, Inc., Austin, TX (US)

(72) Inventors: Mohammad Nizam Kabir, Tempe, AZ (US); Madan Mohan Reddy Vemula, Gilbert, AZ (US); Xu Jason Ma, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/376,904

(22) Filed: Jul. 15, 2021

(65) Prior Publication Data

US 2023/0015111 A1    Jan. 19, 2023

(51) Int. Cl.
*H02M 3/07* (2006.01)

(52) U.S. Cl.
CPC ..................... *H02M 3/07* (2013.01)

(58) Field of Classification Search
CPC ........................................ H02M 3/07
See application file for complete search history.

(56) References Cited

U.S. PATENT DOCUMENTS

| 5,874,850 A | 2/1999 | Pulvirenti et al. | |
| 7,279,959 B1* | 10/2007 | Choy | H02M 3/07 327/536 |
| 2012/0293243 A1* | 11/2012 | Suzuki | H01L 27/0222 327/536 |
| 2013/0155742 A1* | 6/2013 | Lee | H02M 7/103 363/126 |
| 2013/0321070 A1* | 12/2013 | Gagne | G05F 1/12 327/538 |
| 2015/0318852 A1 | 11/2015 | Hoogzaad et al. | |
| 2018/0337545 A1* | 11/2018 | Crosby, II | H02M 3/07 |

OTHER PUBLICATIONS

Ker, Ming-Dou et al., "Ultra-High-Voltage Charge Pump Circuit in Low-Voltage Bulk CMOS Processes With Polysilicon Diodes", IEEE Transactions on Circuits and Systems—II: Express Briefs, vol. 54, No. 1, Jan. 2007.
Lin, H. et al., "New four-phase generation circuits for low voltage charge pumps", Proc. IEEE Int. Symp. Circuits Syst., vol. I, 2001, pp. 504-507.
Luo, Zhicong et al., "An Efficient, Wide-Output, High-Voltage Charge Pump With a Stage Selection Circuit Realized in a Low-Voltage CMOS Process", IEEE Transactions on Circuits and Systems—I: Regular Papers, vol. 66, No. 9, Sep. 2019.

* cited by examiner

*Primary Examiner* — Sibin Chen

(57) ABSTRACT

Aspects of the subject disclosure may include, for example, obtaining, by a first circuit of a charge pump circuit, charge sourced from a power supply operative at a first voltage level, wherein the first circuit comprises a first plurality of transistors, and wherein each of the first plurality of transistors is rated for operation at an applied voltage that is less than the first voltage level, storing the charge in a first capacitor of the first circuit at a first point in time, and transferring the charge stored in the first capacitor to a second capacitor of a second circuit of the charge pump circuit at a second point in time such that the second capacitor stores the charge, wherein the second point in time is subsequent to the first point in time. Other embodiments are disclosed.

15 Claims, 10 Drawing Sheets

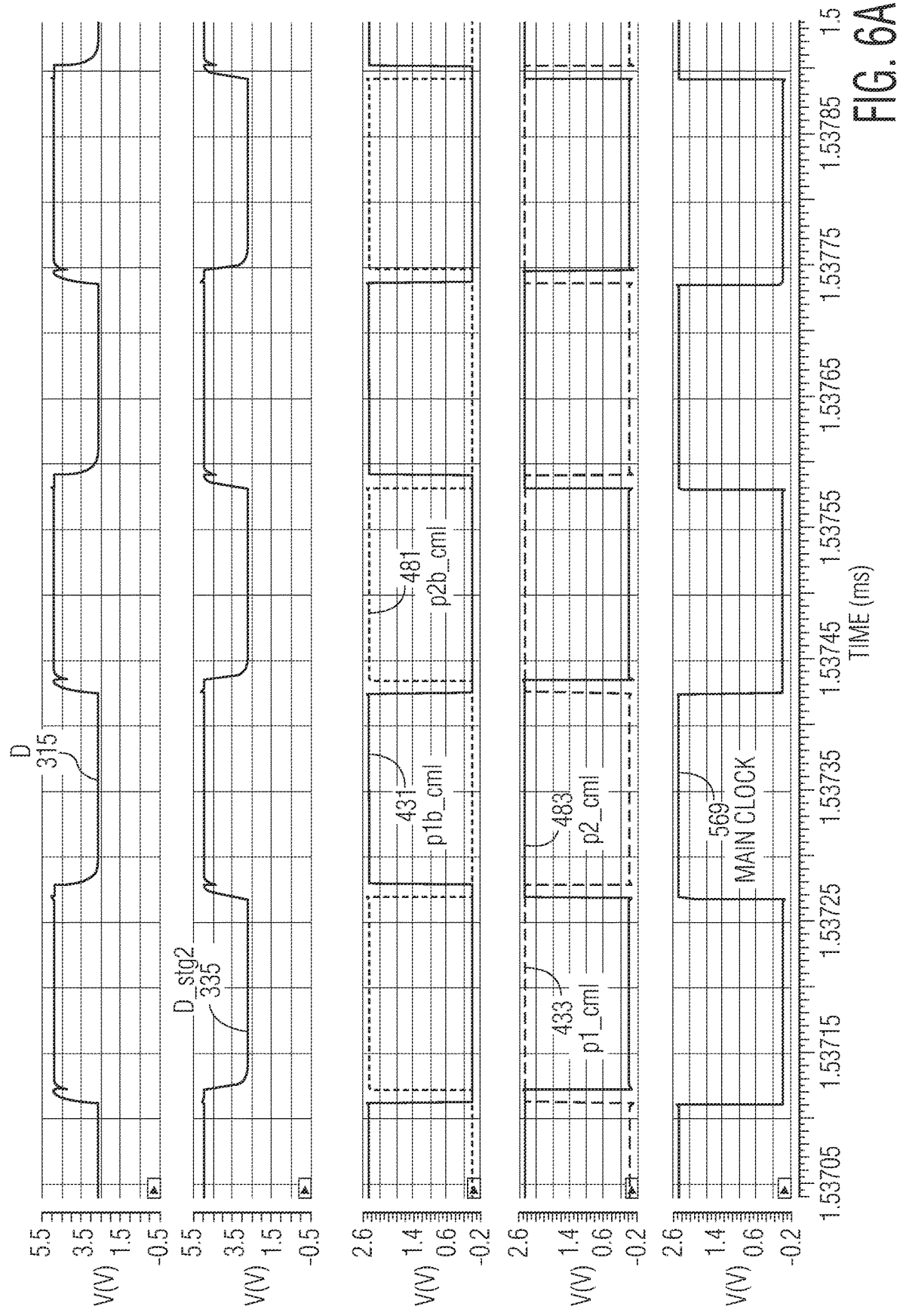

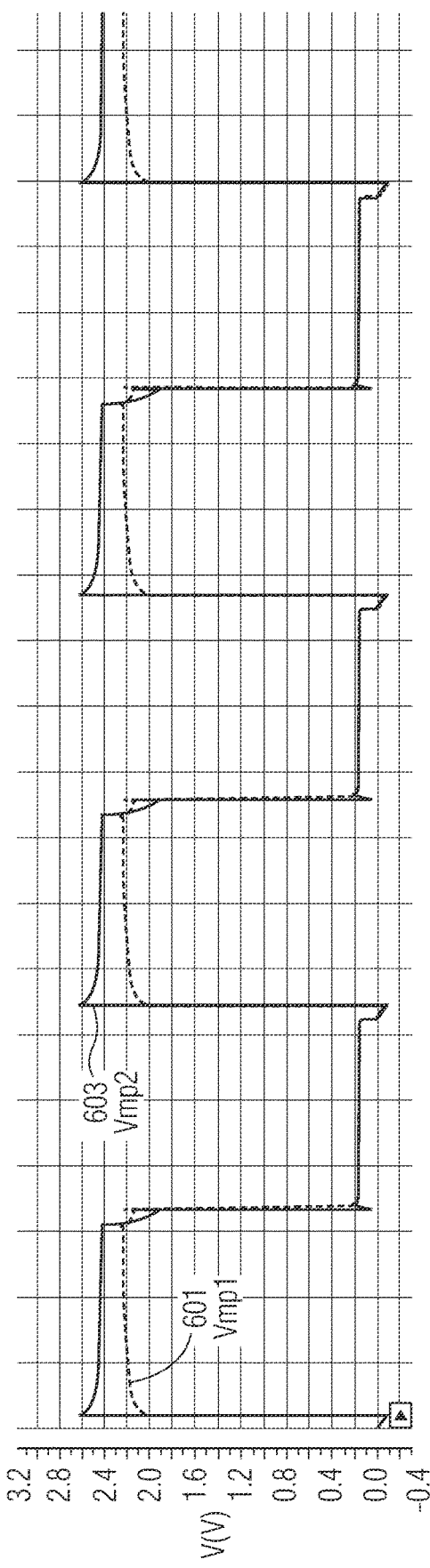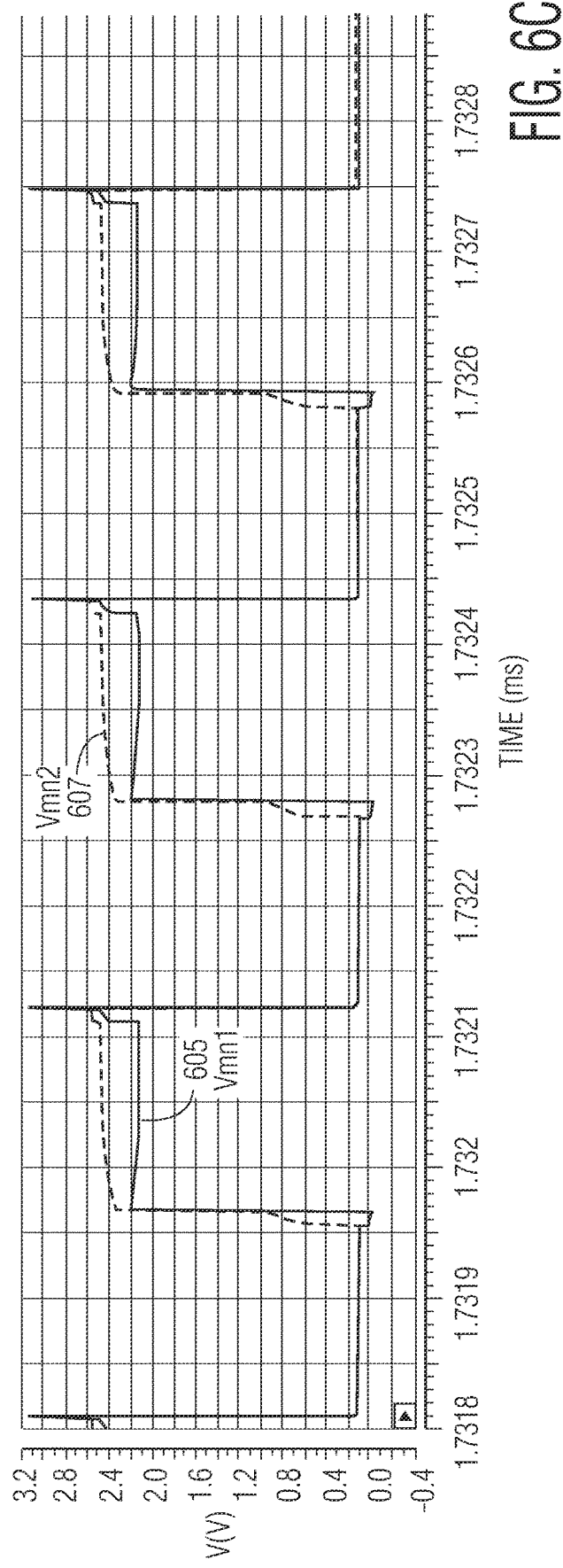
FIG. 6C

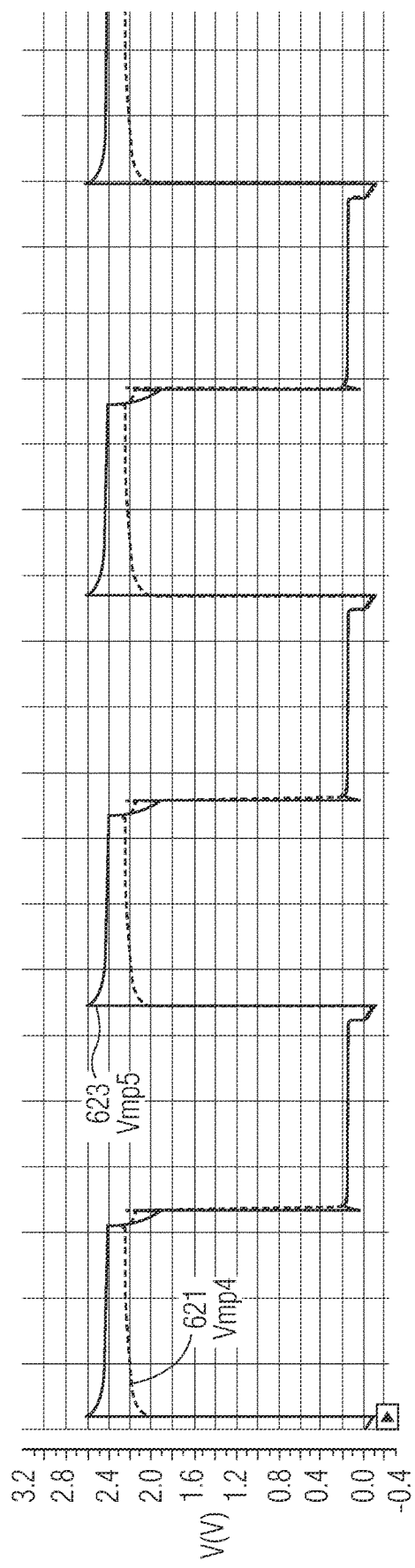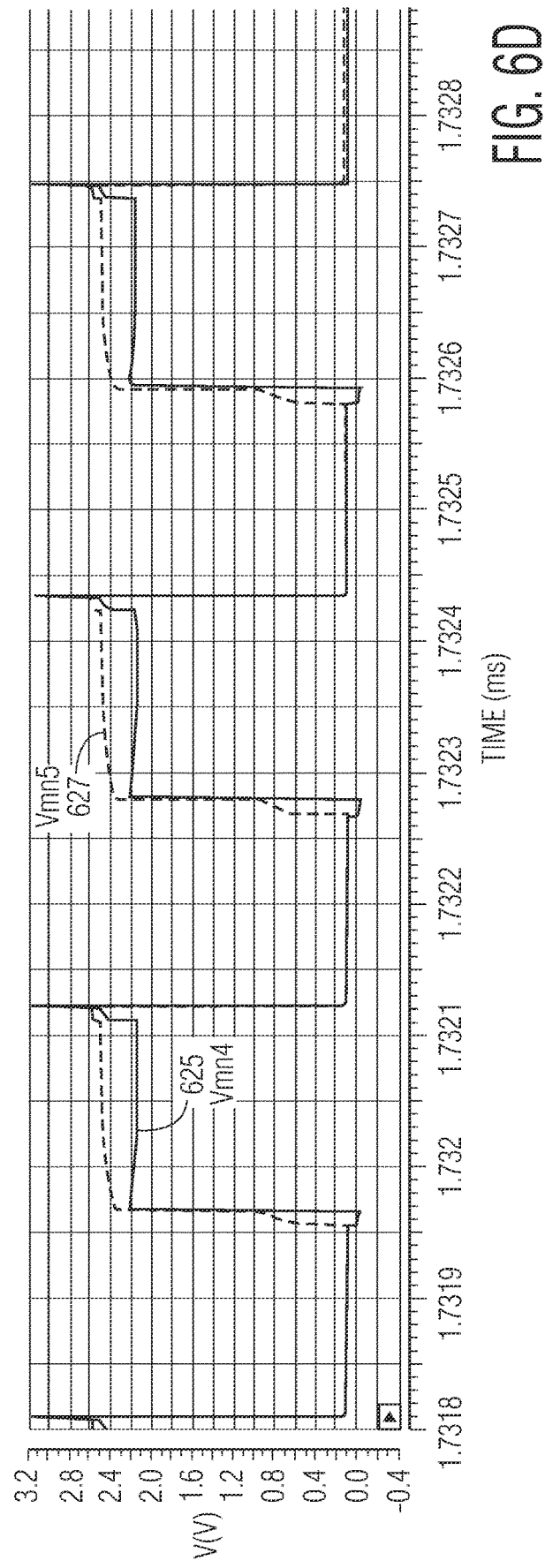
FIG. 6D

HIGH-VOLTAGE CHARGE PUMP USING LOW-VOLTAGE TECHNOLOGY

FIELD OF THE DISCLOSURE

The subject disclosure relates to a high-voltage charge pump using low-voltage technology.

BACKGROUND

Charge pump circuits have applicability in many applications, inclusive of communication systems. Referring to FIG. 2, a model of a charge pump circuit 200 is shown. In particular, the charge pump circuit 200 shown in FIG. 2 is a four-stage diode charge pump circuit, commonly referred to in the art as a Dickson charge pump. The diodes D10, D20, D30, D40, and D50 serve to transfer charge from one stage to the next. In particular, charge is transferred from the power supply VDD to the output node Vout, stage-by-stage. The charge is stored in a given stage by one of the capacitors C10, C20, C30, and C40, in sequence, until the charge is ultimately transferred to an output capacitor Cout. The control or management of the transfer of the charge between the stages is provided by clock signals CLK and CLKB (where CLKB may be the same magnitude, and opposite polarity, relative to CLK).

The voltage fluctuation $\Delta V$ of each pumping node/stage can be expressed as Equation #1:

$$\Delta V = V_{clk} \times (C_{pump}/(C_{pump}+C_{par})) - (I_o/(freq \times (C_{pump}+C_{par})))$$

where Vclk is the voltage amplitude of the clock signals (e.g., CLK and CLKB), Cpump is the pumping capacitance, Cpar is the parasitic capacitance at each pumping node, Io is the output current, and freq is the clock frequency. If Cpar and Io are small, and Cpump is large, then the contributions of Cpar and Io can be ignored in Equation #1. Further, if Vclk is selected to be approximately the same voltage level as the power supply voltage VDD, the voltage fluctuation $\Delta V$ of each pumping node/stage in Equation #1 can be simplified as shown in the following Equation #2:

$$\Delta V \sim V_{clk} = VDD,$$

and the output voltage Vout can, in turn, be expressed as in the following Equation #3:

$$Vout = (NumStage+1) \times (VDD - VD),$$

where NumStage is representative of the number of stages (four in the example of FIG. 2) and VD is representative of the cut-in or turn-on voltage of the diodes D10-D50, where the cut-in or turn-on voltage VD is assumed to be the same for each of the diodes D10-D50.

While the charge pump circuit 200 is effective in theory, it can be difficult to implement in practice. For example, and in respect of the diodes D10-D50, a parasitic p-n junction may exist between an n-well and a grounded p-type substrate. If the voltage on the cathode of a given diode is larger than the junction breakdown voltage between the n-well and the grounded p-substrate, the charges on the cathode may leak to ground through the parasitic p-n junction, thereby degrading the charge transfer efficiency of the circuit 200.

Still further, and in view of Equation #3 above, the number of stages (NumStage) that is needed in a given embodiment or application of the circuit 200 is a function of the power supply voltage VDD and the output voltage Vout that is required. All other conditions being assumed equal, as the spread/difference between the power supply voltage VDD and the output voltage Vout increases, the number of stages needed increases. However, increasing the number of stages represents a cost/penalty in terms of extending/increasing the amount of time until the charge from the power supply VDD is transferred to the output.

BRIEF DESCRIPTION OF THE DRAWINGS

Reference will now be made to the accompanying drawings, which are not necessarily drawn to scale, and wherein:

FIGS. 6A-6D depict exemplary waveforms/plots for signals/nodes associated with the circuits of FIGS. 3-5;

DETAILED DESCRIPTION

Figure 1:
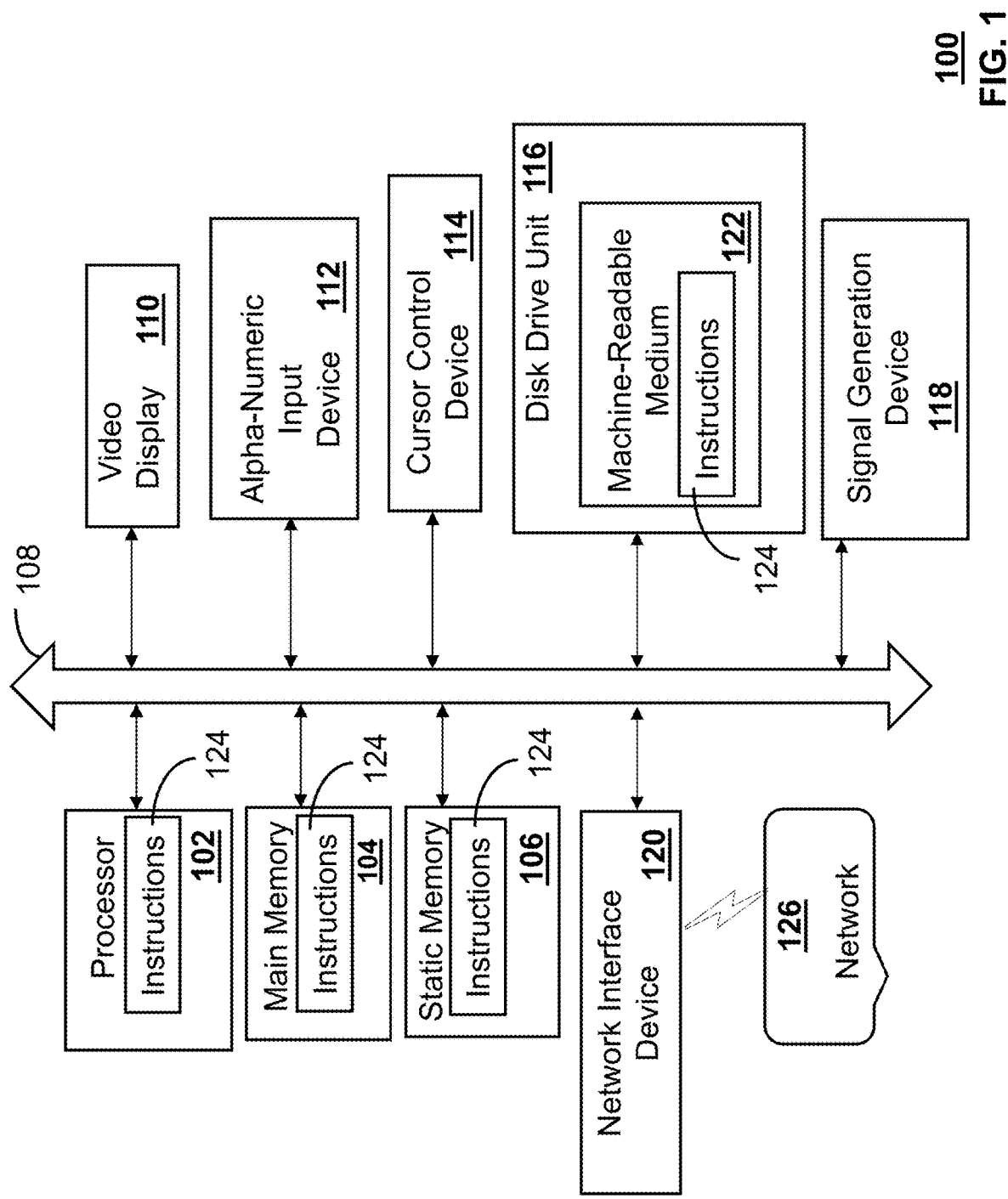
FIG. 1 depicts an exemplary diagrammatic representation of a machine in the form of a computer system within which a set of instructions, when executed, may cause the machine to perform any one or more of the methodologies disclosed herein.

The subject disclosure describes, among other things, illustrative embodiments for reducing the number of stages that are needed to transfer charge from a power supply to an output as part of a charge pump circuit. Other embodiments are set forth below.

One or more aspects of the subject disclosure include one or more devices for transferring charge from a power supply to a load. For example, the one or more devices may include, in whole or in part: a first diode, a second diode, a first stage circuit that is coupled to an output of a power supply via at least the first diode, wherein the power supply provides power to the device at a first voltage level, a second stage circuit that is coupled to the first stage circuit via at least the second diode, a third diode that couples the second stage circuit to an output of the device, wherein the output of the device provides power to a load at a second voltage level that is greater than the first voltage level, a fourth diode that couples the output of the power supply to the second stage circuit, and a fifth diode that couples the input of the power supply to the output of the device.

One or more aspects of the subject disclosure include, in whole or in part, obtaining, by a first circuit of a charge pump circuit, charge sourced from a power supply operative at a first voltage level (i.e., a power supply that produces a voltage at the first voltage level), wherein the first circuit comprises a first plurality of transistors, and wherein each of the first plurality of transistors is rated for operation at an applied voltage that is less than the first voltage level, storing the charge in a first capacitor of the first circuit at a first point in time, and transferring the charge stored in the first capacitor to a second capacitor of a second circuit of the charge pump circuit at a second point in time such that the second capacitor stores the charge, wherein the second point in time is subsequent to the first point in time.

One or more aspects of the subject disclosure include, in whole or in part, enabling a transfer of charge from a power supply to a first stage circuit of a charge pump circuit at a first rate that is greater than zero during a first time period via a selection of a first value of a control signal, and enabling a transfer of charge from the power supply to the first stage circuit of the charge pump circuit at a second rate during a second time period via a selection of a second value of the control signal that is different from the first value, wherein the second time period is subsequent to the first time period, and wherein the second rate is greater than zero and different from the first rate.

Aspects of this disclosure may be implemented in conjunction with one or more communication devices, such as for example one or more base stations of one or more communication systems. In some embodiments, methodological acts/activities may be facilitated by a performance of one or more operations. The operations, in turn, may be performed in conjunction with an execution of one or more instructions by one or more processors of a processing system. Aspects of this disclosure may adhere/conform to one or more communication techniques, standards, and/or protocols.

Figure 3:
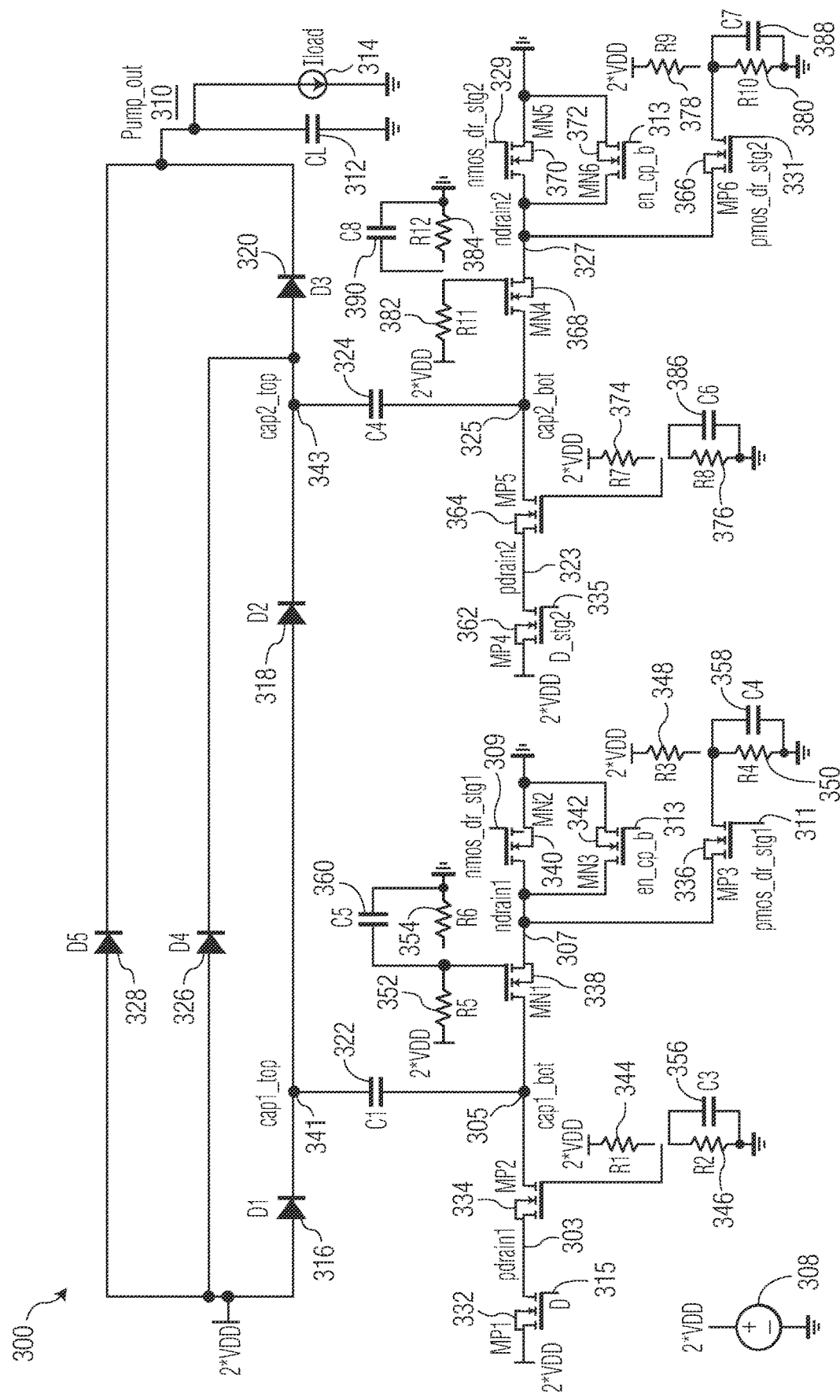
FIG. 3 depicts an illustrative embodiment of a charge pump circuit in accordance with aspects of this disclosure.

Referring now to FIG. 3, an illustrative embodiment of charge pump circuit 300 is shown. The charge pump circuit 300 may be utilized to transfer charge sourced from a power supply 308 (also represented in FIG. 3 as 2*VDD) to an output node Pump_out 310. At the output node Pump_out 310, a capacitor CL 312 may be used to store the charge that is transferred via the charge pump circuit 300. The stored charge associated with the capacitor CL 312 may be used to drive a load, as represented by the current sink Iload 314 in FIG. 3.

Figure 2:
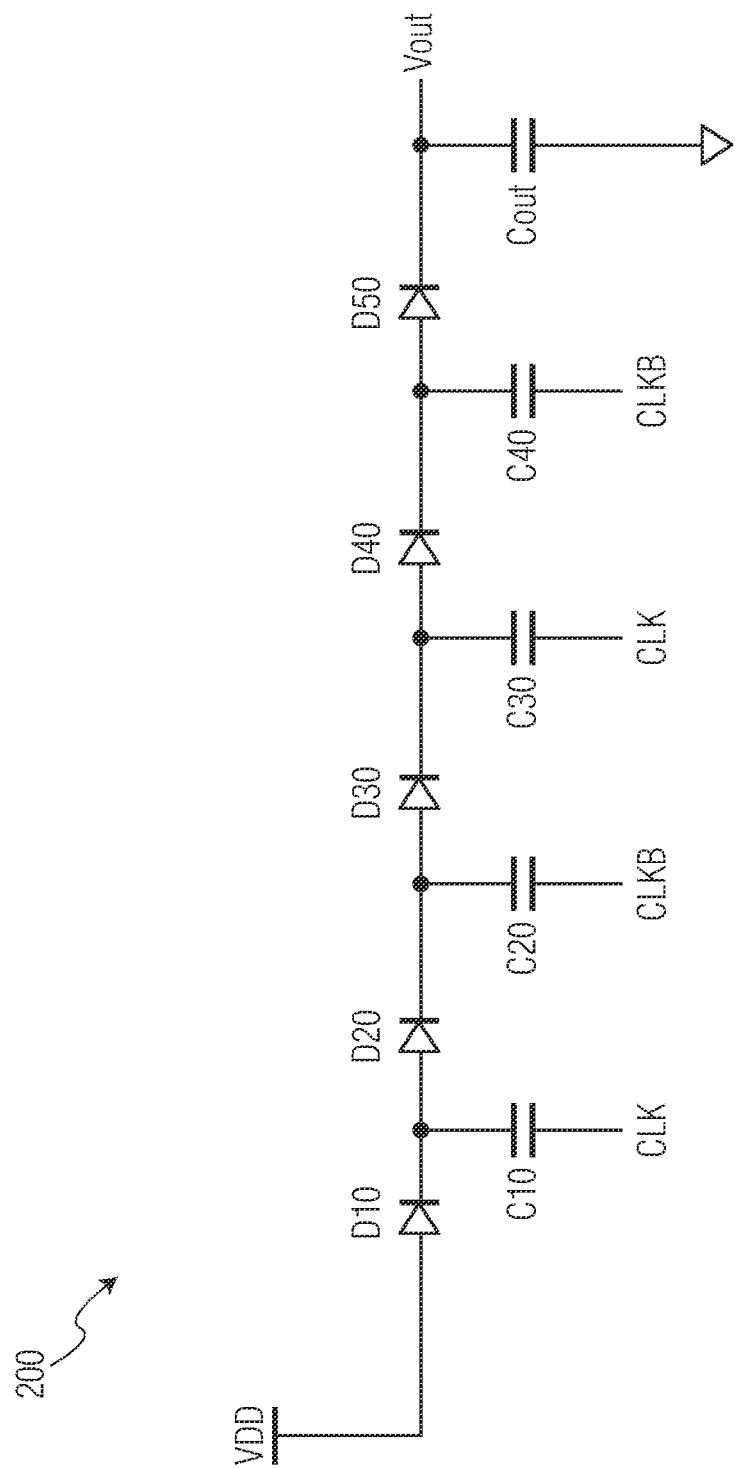
FIG. 2 depicts a model of a charge pump circuit in accordance with the prior art.

The charge pump circuit 300 bears similarities to the charge pump circuit 200 of FIG. 2. However, there are important differences between the circuits 200 and 300 as set forth in further detail below. As a preliminary matter, it should be noted that the charge pump circuit 300 is operative with a power supply of 2*VDD ("two times VDD"), whereas the charge pump circuit 200 is operative with a power supply of merely VDD. Stated differently, the charge pump circuit 300 may utilize a power supply of a greater magnitude—e.g., twice the voltage—relative to the power supply utilized by the charge pump circuit 200. The use of a greater-valued power supply by the charge pump circuit 300 (relative to the circuit 200) may tend to reduce the number of stages that are required to obtain a given output voltage relative to the charge pump circuit 200 (all other conditions being assumed equal).

Much like the circuit 200, the circuit 300 includes: (1) three diodes D1 316, D2 318, and D3 320 arranged in sequence between the source power supply 308 (2*VDD) and the output node Pump_out 310, and (2) capacitors C1 322 and C2 324 arranged between successive ones of the diodes D1 316, D2 318, and D3 320. In this regard, the circuit 300 is shown in FIG. 3 as being a two-stage charge pump circuit. One skilled in the art will appreciate, based on a review of this disclosure, that the number of stages that may be utilized in a given embodiment of the circuit 300 may be different from two. For example, a greater number of stages may be obtained by replicating instances/portions of components of the circuit 300.

In addition to the (three) diodes D1-D3 316, 318, and 320, the circuit 300 may include a (fourth) diode D4 326 connected between the source power supply 308 (2*VDD) and the capacitor C2 324 and a (fifth) diode D5 328 connected between the source power supply 308 (2*VDD) and the output Pump_out 310. The diodes D4 326 and D5 328 may be operative during a start-up time period, such as for example following an enabling of the circuit 300. For example, and assuming a starting point of operation where the capacitors C1 322, C2 324, and CL 312 are all discharged, when the power supply 308 (2*VDD) is turned-on/enabled, or otherwise applied to the circuit 300, the output Pump_out 310 may quickly rise to 2*VDD minus the turn-on/cut-in voltage (VD) associated with the diode D5 328. Similar remarks apply with respect to the node cap2_top 343 involved in the connection between the cathode of the diode D4 326 and the capacitor C2 324. Thus, relative to the circuit 200, the circuit 300 may feature a faster response time in terms of signal (e.g., voltage) available at the output Pump_out 310 measured from the point in time when, e.g., the charge pump circuit 300 is activated or enabled.

Once portions of the circuit 300 associated with the charge-pumping functionality are up/operational, and charge has been transferred from the power supply 308 (2*VDD) to the output Pump_out 310 via the path involving the diodes D1-D3 316-320, the diodes D4 326 and D5 328 may become reverse-biased, and hence, might not conduct very much current (e.g., the diodes D4 326 and D5 328 may conduct a negligible amount of current). Stated differently, the diodes D4 326 and D5 328 may, for all intents and purposes, be considered "off" once they are reverse-biased.

The first stage/first stage circuit of the (two-stage) circuit 300 may include/incorporate the following components, connected as shown in FIG. 3: the capacitor C1 322, transistors MP1 332, MP2 334, MP3 336, MN1 338, MN2 340, and MN3 342, resistors R1 344, R2 346, R3 348, R4 350, R5 352, and R6 354, and capacitors C3 356, C4 358, and C5 360. The second stage/second stage circuit of the (two-stage) circuit 300 may include/incorporate the following components, connected as shown in FIG. 3: the capacitor C2 324, transistors MP4 362, MP5 364, MP6 366, MN4 368, MN5 370, and MN6 372, resistors R7 374, R8 376, R9 378, R10 380, R11 382, and R12 384, and capacitors C6 386, C7 388, and C8 390.

In the first stage the transistors MP1 332, MP2 334, MN1 338, and MN2 340 may be arranged sequentially between the power supply 308 (2*VDD) and a reference corresponding to ground, which is to say that respective source and drain terminals associated with the transistors 332, 334, 338, and 340 may be connected to one another in the manner shown in FIG. 3; similar remarks apply in respect of the transistors MP4 362, MP5 364, MN4 368, and MN5 370 of the second stage. While particular types (e.g., PMOS and NMOS) of transistors are shown in FIG. 3, other types of transistors may be used without departing from the scope/spirit of this disclosure. Similar remarks apply with respect to other transistors shown in other figures of this disclosure.

In some embodiments, the transistors of the first and second stages of the circuit 300 may be rated for (a nominal, maximum) operation at VDD. However, as set forth above, the circuit 300 may operate with a power supply 308 equal to, e.g., 2*VDD. In practical terms, this implies that the transistors of the circuit 300 may be manufactured to utilize a smaller form-factor relative to operations rated at, e.g., 2*VDD. Thus, all other conditions being assumed equal, the transistors may consume less real-estate/space within a housing or other structure, such as for example a packaging associated with an integrated circuit (IC). More generally, the transistors of the first and second stages may be rated for operation at a voltage that is different from (e.g., is less than) the power supply voltage that is utilized.

For reference purposes, various nodes between the components of the first stage are labeled as pdrain1 303, cap1_bot 305, ndrain1 307, nmos_dr_stg1 309, pmos_dr_stg1 311, en_cp_b 313, and D 315. Similarly, various nodes between the components of the second stage are labeled as pdrain2 323, cap2_bot 325, ndrain2 327, nmos_dr_stg2 329, pmos_dr_stg2 331, and D_stg2 335. The second stage may also include/incorporate the node en_cp_b 313. Various ones of the nodes of the (first and second stages of the) circuit 300 of FIG. 3 may be driven by signals generated by the circuit 400 of FIG. 4 and/or the circuit 500 of FIG. 5, as set forth in further detail below. By way of introduction, aspects of the circuits 400 and 500 may facilitate phases of a non-overlapping clock signal. Operations associated with the first and second stages of the circuit 300 are described below in respect of this non-overlapping clock signal.

During a first phase of the non-overlapping clock signal: (1) the transistors MP1 332 and MP2 334 may connect the node cap1_bot 305 to the power supply 308(2*VDD), and (2) the transistors MN4 368 and MN5 370 may connect the node cap2_bot 325 to ground. During a second phase of the non-overlapping clock signal: (1) the transistors MN1 338 and MN2 340 may connect the node cap1_bot 305 to ground, and (2) the transistors MP4 362 and MP5 364 may connect the node cap2_bot 325 to the power supply 308 (2*VDD). Each of the transistors MN1 338, MN4 368, MP2 334, and MP5 364 may be biased to VDD using a respective ladder formed by equal-valued resistors (e.g., the ladder formed by the resistors R5 352 and R6 354 in the case of MN1 338, the ladder formed by the resistors R11 382 and R12 384 in the case of MN4 368, the ladder formed by the resistors R1 344 and R2 346 in the case of MP2 334, and the ladder formed by the resistors R7 374 and R8 376 in the case of MP5 364). When the transistor MN2 340 is off, the transistor MP3 336 may be on to bias the drain of the transistor MN2 340 at VDD via the ladder formed by equal-valued resistors R3 348 and R4 350. Similarly, when the transistor MN5 370 is off, the transistor MP6 366 may be on to bias the drain of the transistor MN5 370 at VDD via the ladder formed by equal-valued resistors R9 378 and R10 380.

Figure 4:
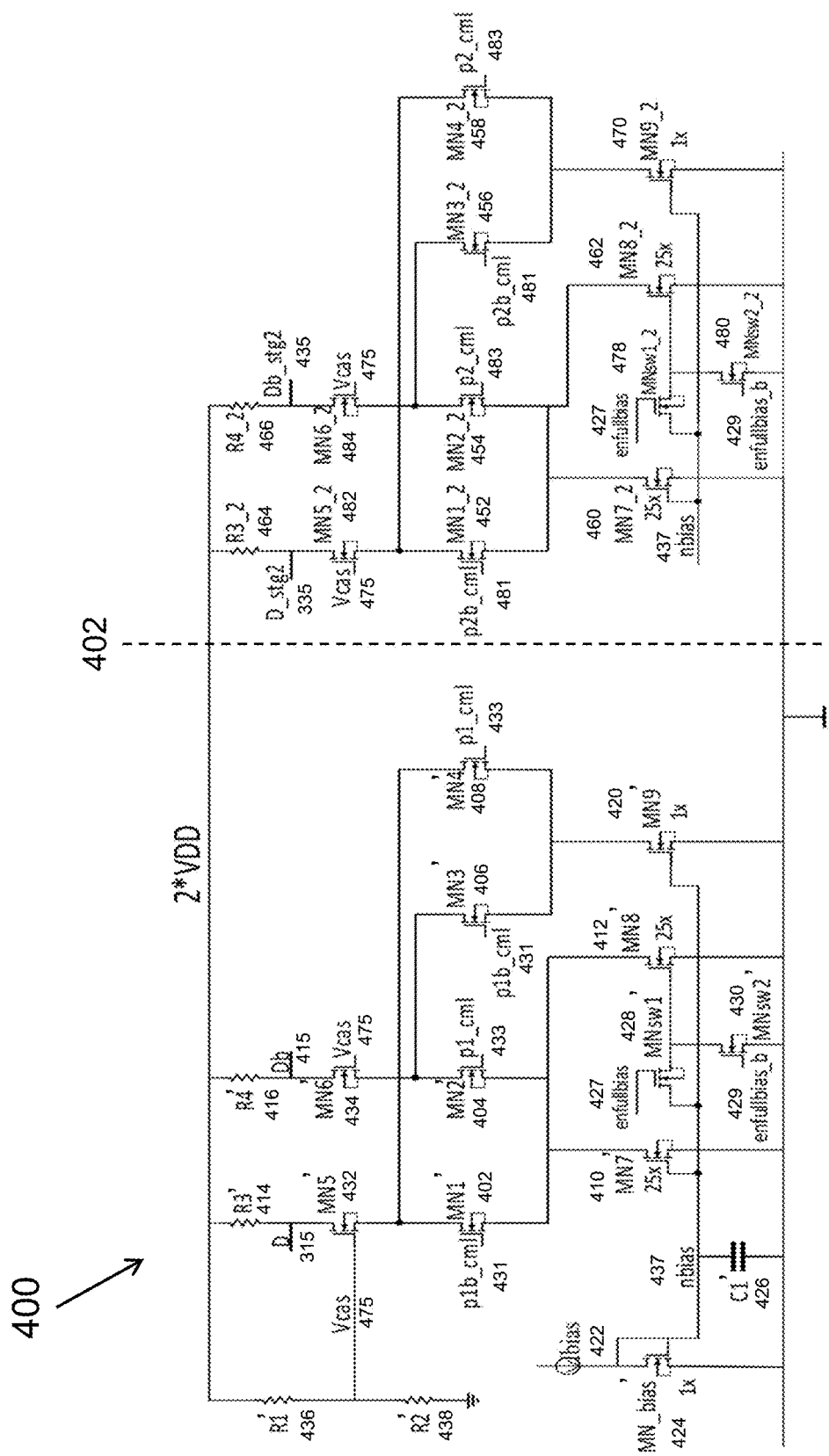
FIG. 4 depicts a circuit for providing drive signals to stages of the charge pump circuit of FIG. 3.

Referring now more specifically to FIG. 4, the circuit 400 is shown. The circuit 400, which may be referred to as a current mode logic or drive circuit, may be used to generate/drive signals associated with the nodes D 315 and D_stg2 335 of the transistors MP1 332 and MP4 362 of the circuit 300 of FIG. 3. For the sake of reference, the circuit 400 also shows nodes labeled as Db 415 and Db_stg2 435, which may have inverted states/values relative to their counterparts D 315 and D_stg2 335, respectively, which is to say that as D 315 increases Db 415 may decrease (and vice versa). As shown in FIG. 4, the circuit 400 may be operative in accordance with a power supply of 2*VDD (e.g., the circuit 400 may utilize the same power supply 308 (2*VDD) as the circuit 300 of FIG. 3).

As part of the circuit 400, the pair of transistors MN1' 402 and MN2' 404, and the pair of transistors MN3' 406 and MN4' 408, may correspond to respective differential pairs that are driven by the non-overlapping clock signal referred to above. The transistors MN7' 410 and MN8' 412 may correspond to so-called tail current sources that may be (substantially) equal in size/magnitude.

During start-up, the transistor MN8' 412 may be turned-off to limit the current flowing through the resistors R3' 414 and R4' 416. Since the current flowing through the resistors R3' 414 and R4' 416 may be (approximately) half of what it would have been had the transistor MN8' 412 been on, the value of the voltage at node D 315 (corresponding to the drain terminal of the transistor MN5' 432) may be substantially large (e.g., the voltage drop/difference across the resistor R3' 414 may be relatively small). Since the signal/value at node D 315 in FIG. 4 drives the switch MP1 332 of the circuit 300 of FIG. 3, during start-up the transistor MP1 332 may have (approximately) half the drive strength that it may have outside of start-up, thereby increasing the effective resistance of the transistor MP1 332 during start-up relative to operations outside of start-up. The increased resistance of the transistor MP1 332 during start-up may reduce the charging current flowing through the capacitor C1 322, thereby reducing the current demand from the power supply 308 (2*VDD). Once the capacitor C1 322 is charged, the transistor MN8' 412 may be enabled, which may cause additional current to flow through, e.g., the resistor R3' 414, thereby reducing the value of the voltage at node D 315 in FIG. 4. This change in the value of the voltage at the node D 315 may reduce the resistance of the transistor MP1 332, such that the portion of the charge pump circuit 300 associated with the first stage (e.g., C1 322) may be primed/ready to deliver charge for sourcing the load Iload 314.

The transistor MN9' 420 may correspond to another tail current source (in addition to the transistors MN7' 410 and MN8' 412). As between the transistors MN7' 410, MN8' 412, and MN9' 420, the transistor MN9' 420 may carry a small fraction/portion of the overall current (e.g., each of the transistors MN7' 410 and MN8' 412, when on, may carry/conduct at least twenty-five times [25×] the amount of current that is carried/conducted by the transistor MN9' 420 [1×]; other values or ratios of respective portions of levels of current between the transistors may be used in some embodiments, such as for example a ratio of twenty [20×] to one [1×]). In this respect, the circuit 400 may include bias components represented by a bias current Ibias 422 that feeds a bias transistor MN bias' 424. The bias current Ibias 422 may effectively be transferred/replicated in respect of bias components: capacitor C1' 426, transistor/switch MNsw1' 428 and transistor/switch MNsw2' 430. The control signals enfullbias 427 and enfullbias_b 429 may be used to drive the transistor/switch MNsw1' 428 and transistor/switch MNsw2' 430, respectively, where the signal enfullbias_b 429 may be the opposite phase/polarity relative to the signal enfullbias 427.

The transistor MN9' 420 may provide a pathway for current to flow through the transistors MN3' 406 and MN4' 408. The transistors MN3' 406 and MN4' 408 may be driven by opposite phase/polarity signals p1b_cm1 431 and p1_cm1 433, respectively; the transistors MN1' 402 and MN2' 404 may be driven by the signals p1b_cm1 431 and p1_cm1 433, respectively.

Based on the arrangement shown in FIG. 4, when the transistor MN1' 402 is off, the transistor MN5' 432 might not be completely off; e.g., the transistor MN5' 432 may be on with a small amount of current flowing therein (e.g., an amount of current flowing through the transistor MN5' 432 may be such that the voltage drop across the resistor R3' 414 is less than one-tenth of the turn-on voltage of the transistor MP1 332 of FIG. 3). Providing for current flowing through the transistor MN5' 432 (by way of the transistor MN4' 408 and the transistor MN9' 420, even when the transistor MN1' 402 is off) may reduce the voltage swing at a terminal (e.g., the source terminal) of the transistor MN5' 432 and may help to keep the voltage of the transistor MN5' 432 within the limit of the supply voltage. Similarly, when the transistor MN2' 404 is off, the transistor MN6' 434 might not be completely off; e.g., the transistor MN6' 434 may be on with a small amount of current therein. Providing for current flowing through the transistor MN6' 434 (by way of the transistor MN3' 406 and the transistor MN9' 420, even when the transistor MN2' 404 is off) may reduce the voltage swing at a terminal (e.g., the source terminal) of the transistor MN6' 434 and may help to keep the voltage of the transistor MN6' 434 within the limit of the supply voltage. In brief, the contiguous path of current provided by way of the transistor MN9' 420 may help to extend the reliable lifetime/operation associated with other transistors shown in FIG. 4, such as the transistors MN5' 432 and MN6' 434.

The resistors R1' 436 and R2' 438 may serve to establish a bias voltage (Vcas) 475 for the transistors MN5' 432 and MN6' 434. For example, and assuming that the resistors R1' 436 and R2' 438 are equal-valued, the voltage Vcas 475 may be set equal to VDD.

The foregoing description set forth the operations/functionality associated with the portion of the circuit 400 to the left of the superimposed/dashed reference line 402 in respect of the driving signal/node D 315 used to drive the first stage of the circuit 300 of FIG. 3. Similar operations/functionality may be provided in respect of the portion of the circuit 400 to the right of the superimposed/dashed reference line 402 in respect of the driving signal/node D_stg2 335 used to drive the second stage of the circuit 300 of FIG. 3. Thus, a complete re-description of those operations/functionality is omitted herein for the sake of brevity.

In brief, the circuit 400 also includes transistors MN1_2 452, MN2_2 454, MN3_2 456, MN4_2 458, MN5_2 482, MN6_2 484, MN7_2 460, MN8_2 462, MN9_2 470, MNsw1_2 478, and MNsw2_2 480, and resistors R3_2 464 and R4_2 466, where the suffix_2 has been used to the right of the reference line 402 to mirror/map to counterpart components utilizing the prime suffix (') to the left of the reference line 402 in FIG. 4. The transistors MN1_2 452, MN2_2 454, MN3_2 456, and MN4_2 458 may each be driven by one of opposite phase/polarity signals p2b_cm1 481 and p2_cm1 483 as shown in FIG. 4. The transistors MN5_2 482 and MN6_2 484 may be driven by the same reference/bias voltage Vcas 475 as the transistors MN5' 482 and MN6' 484. The transistors MNsw1_2 478 and MNsw2_2 480 may be driven by enfullbias 427 and enfullbias_b 429, similar to what is shown for transistors MNsw1' 428 and MNsw2' 430, respectively. The transistor MN7_2 460 may be driven by the same bias signal (nbias) 437 as the transistor MN7' 410.

Figure 5:
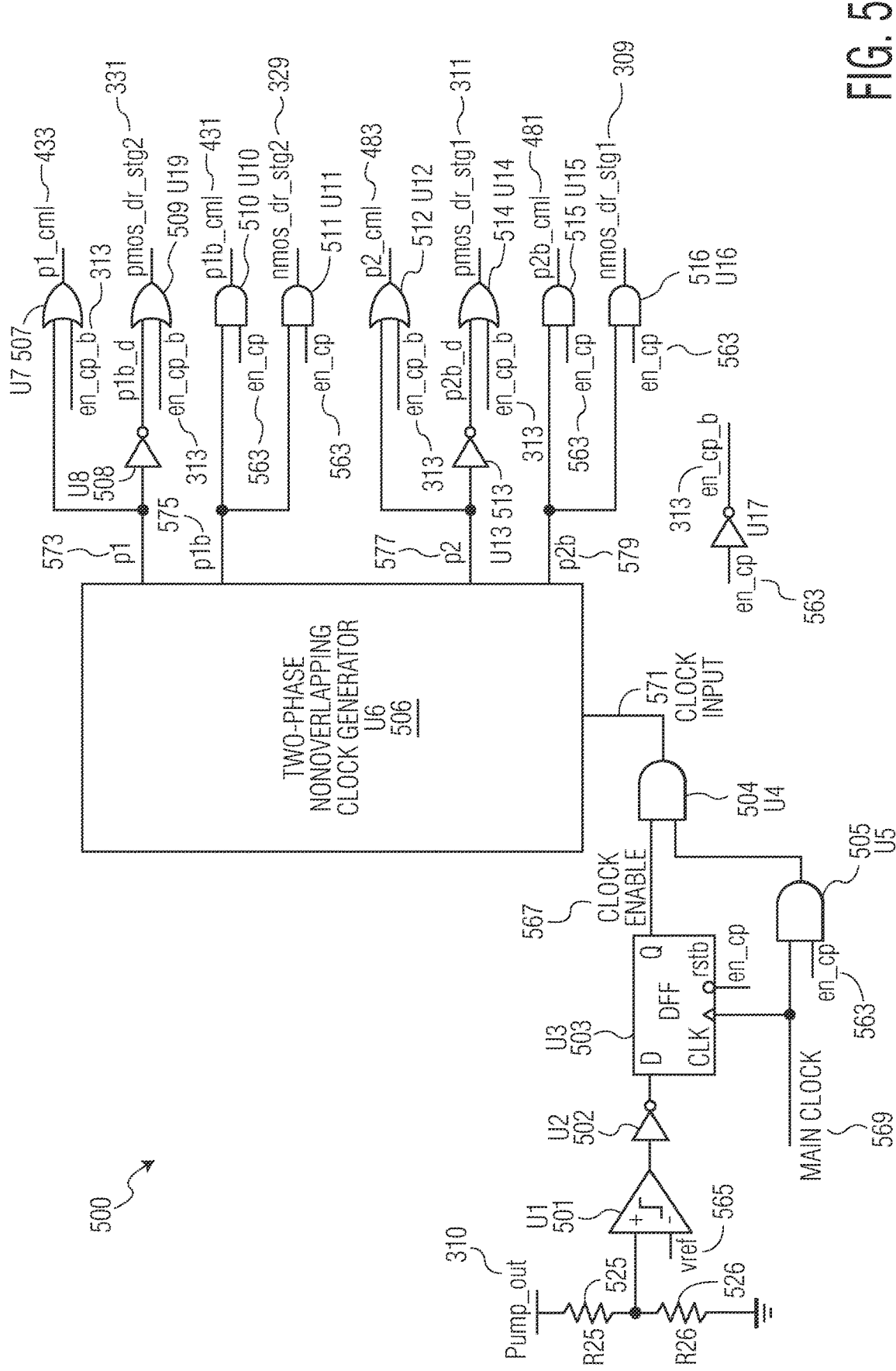
FIG. 5 depicts a clock generating circuit for generating and providing signals for the circuits of FIGS. 3-4 in accordance with aspects of this disclosure.

Referring now more specifically to FIG. 5, the circuit 500 is shown. The circuit 500, which may be referred to as a clock generation circuit, may be used to generate/drive signals associated with the nodes p1_cm1 433, pmos_dr_stg2 331, p1b_cm1 431, nmos_dr_stg2 329, p2_cm1 483, pmos_dr_stg1 311, p2b_cm1 481, nmos_dr_stg1 309, and en_cp_b 313 shown in FIGS. 3-4. As shown in FIGS. 3 and 5, the output node Pump_out 310 of the charge pump circuit 300 may be provided to a resistor divider/ladder R25 525 and R26 526. The voltage across the resistor R26 526 may be compared to a threshold established by a reference voltage (vref) 565 via a comparator U1 501. The (value of the) output of the comparator U1 501 may be provided as an input to an inverter U2 502. The output of the inverter U2 502 may be provided as an input to a (D-type of) flip-flop U3 503, where the flip-flop may be selectively enabled via the control signal en_cp 563. The flip-flop U3 503 may be driven from a system or main clock signal 569, and may generate an output denoted as Clock Enable 567 in FIG. 5. The output of the flip-flop U3 503 may be provided as a first input to an AND gate U4 504; a second input to the AND gate U4 504 may be obtained from an output of another AND gate U5 505. The output of the AND gate U5 505 may be based on the logical-AND of the main clock 569 and the control signal en_cp 563 as shown in FIG. 5. As one of skill in the art would appreciate, the components U2-U5 502-505 may effectively establish a logic circuit that may selectively enable/disable a transfer of charge based on the output of the comparator U1 501.

The output of the AND gate U4 504 may be provided as an input (denoted as Clock Input 571 in FIG. 5) to a two-phase non-overlapping clock generator circuit U6 506. The operations and structure of the clock generator U6 506 would be appreciated and known to one of skill in the art; accordingly, details associated with the clock generator U6 506 are omitted for the sake of brevity/simplicity.

The clock generator U6 506 may generate and output signals p1 573, p1b 575, p2 577, and p2b 579. The signals p1 573, p1b 575, p2 577, and p2b 579 may be gated via logic components/elements U7 507, U8 508, U9 509, U10 510, U11 511, U12 512, U13 513, U14 514, U15 515, and U16 516 in the manner shown in FIG. 5 to generate the signals p1_cm1 433, pmos_dr_stg2 331, p1b_cm1 431, nmos_dr_stg2 329, p2_cm1 483, pmos_dr_stg1 311, p2b_cm1 481, and nmos_dr_stg1 309. Also, the control signal en_cp 563 may be inverted via inverter U17 517 to generate the signal en_cp_b 313.

Referring to FIG. 6A (see also FIGS. 3-5), plots of the (values of the) voltage at the signals/nodes D 315, D_stg2 335, p1b_cm1 431, p2b_cm1 481, p1_cm1 433, p2_cm1 483, and Main Clock 569 in accordance with aspects of this disclosure are shown. In particular, for each of the plots the voltage is shown on the vertical axis, and time is represented on the horizontal axis.

Figure 6B:
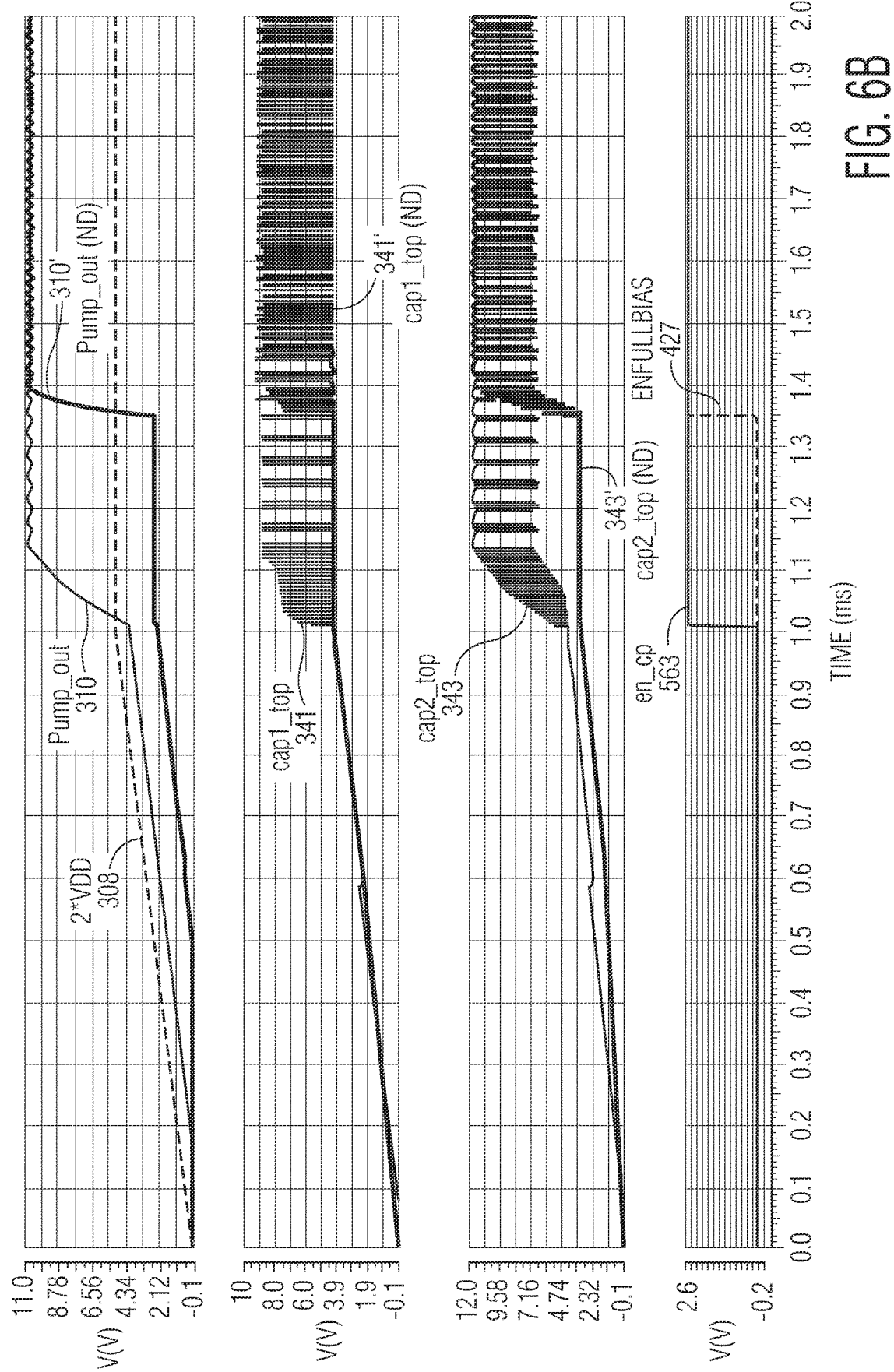

Referring to FIG. 6B (see also FIGS. 3-5), plots of the (values of the) voltage corresponding to the power supply 308 (2*VDD) and the voltage corresponding to the signals/nodes Pump_out 310, cap1_top 341, cap2_top 343, en_cp 563, and enfullbias 427 in accordance with aspects of this disclosure are shown. In particular, for each of the plots the voltage is shown on the vertical axis, and time is represented on the horizontal axis. As shown in FIG. 6B, the power supply 308 (2*VDD) may incur a delay or ramp-up time from time 0 until, e.g., time 1.0 milliseconds.

Also shown in FIG. 6B are counterpart plots Pump_out (ND) 310', cap1_top (ND) 341', and cap2_top (ND) 343', which are counterpart to plots Pump_out 310, cap1_top 341, and cap2_top 343, respectively. The suffix "(ND)" in this instance refers to an embodiment of the circuit 300 of FIG. 3 where the diodes D4 326 and D5 328 are removed from the circuit. A comparison between, e.g., Pump_out 310 and Pump_out (ND) 310' in FIG. 6B demonstrates the impact that the inclusion of the diodes D4 326 and D5 328 have on the voltage at the output Pump_out 310 in FIG. 3; e.g., the voltage at the output rises faster (following the enabling/assertion of the signal en_cp 563) with the diodes D4 326 and D5 328 present. Similar remarks apply in respect of: a comparison of cap1_top 341 to cap1_top (ND) 341' and a comparison of cap2_top 343 to cap2_top (ND) 343'. Also, with the diodes D4 326 and D5 328 present, the charge pump circuit 300 is capable of supplying current to the load (Iload) 314 prior to the assertion/enabling of the signal enfullbias 427. In contrast, and without the diodes D4 326 and D5 328 present, the Pump_out (ND) 310' signal remains well below the power supply 308 voltage of 2*VDD until the signal enfullbias 427 is enabled.

Referring to FIG. 6C, plots of voltages (denoted as Vmp1 601, Vmp2 603, Vmn1 605, and Vmn2 607) relative to time associated with the first stage of the circuit 300 of FIG. 3 are shown. The plot Vmp1 601 may correspond to the difference between the power supply 308 (2*VDD) and the node pdrain1 303 (e.g., the plot Vmp1 601 may correspond to the voltage across the source and drain of the transistor MP1 332). The plot Vmp2 603 may correspond to the difference between the node pdrain1 303 and the node cap1_bot 305 (e.g., the plot Vmp2 603 may correspond to the voltage across the source and drain of the transistor MP2 334). The plot Vmn1 605 may correspond to the difference between the node cap1_bot 305 and the node ndrain1 307 (e.g., the plot Vmn1 605 may correspond to the voltage across the drain and source of the transistor MN1 338). The plot Vmn2 607 may correspond to the difference between the node ndrain1 307 and ground (e.g., the plot Vmn2 607 may correspond to the voltage across the drain and source of the transistor MN2 340).

Referring to FIG. 6D, plots of voltages (denoted as Vmp4 621, Vmp5 623, Vmn4 625, and Vmn5 627) relative to time associated with the second stage of the circuit 300 of FIG. 3 are shown. The plot Vmp4 621 may correspond to the difference between the power supply 308 (2*VDD) and the node pdrain2 323 (e.g., the plot Vmp4 621 may correspond to the voltage across the source and drain of the transistor MP4 362). The plot Vmp5 623 may correspond to the difference between the node pdrain2 323 and the node cap2_bot 325 (e.g., the plot Vmp5 623 may correspond to the voltage across the source and drain of the transistor MP5 364). The plot Vmn4 625 may correspond to the difference between the node cap2_bot 325 and the node ndrain2 327 (e.g., the plot Vmn4 625 may correspond to the voltage across the drain and source of the transistor MN4 368). The plot Vmn5 627 may correspond to the difference between the node ndrain2 327 and ground (e.g., the plot Vmn5 627 may correspond to the voltage across the drain and source of the transistor MN5 370).

Taken collectively, and assuming that the power supply 308 (2*VDD) is nominally equal to 5 Volts, the plots shown in FIGS. 6C-6D demonstrate that the magnitude of the voltage across the transistors MP1 332, MP2 334, MP4 362, MP5 364, MN1 338, MN2 340, MN4 368, and MN5 370 (as measured between source and drain terminals) may be approximately equal to a maximum of VDD (e.g., 2.5 Volts in this specific example)—e.g., a maximum of VDD+/−5%. Stated differently, the transistors MP1 332, MP2 334, MP4 362, MP5 364, MN1 338, MN2 340, MN4 368, and MN5 370 may be rated for operation at an applied voltage up to a value that is equal to half of the supply voltage, plus or minus 5%, where that applied voltage may be applied with reference to/across any two terminals of the transistor (e.g., source and drain terminals). The power supply 308 may provide power at a voltage level that is 5 Volts plus or minus some threshold value (e.g., 5%). Also, in other embodiments, a power supply voltage of 3.3V may be used in conjunction with transistors rated for 1.8V operation. In general, and in some embodiments, the transistors may be rated for operation with an applied voltage that is less than a power supply voltage that is utilized.

Thus, all other conditions being assumed equal, transistors of the circuit 300 of FIG. 3, such as for example the transistors MP1 332, MP2 334, MN1 338, MN2 340, MN3 342, MP3 336, MP4 362, MP5 364, MN4 368, MN5 370, MN6 372, and MP6 366 may be fabricated using a smaller form-factor to accommodate operation up to approximately VDD (relative to a condition of the transistors being fabricated to accommodate operation up to the power supply 308 value of 2*VDD). It should be kept in mind that the values of voltage and time set forth above in respect of, e.g., FIGS. 6A-6D are representative; other values may be used in some embodiments.

Figure 7:
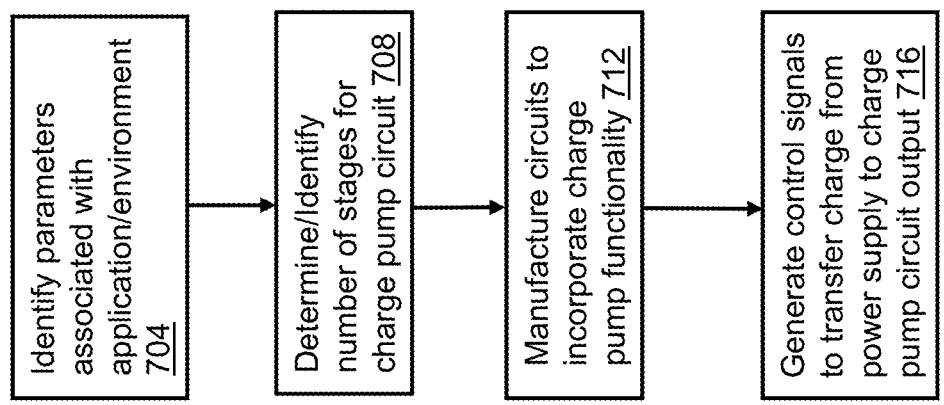
FIG. 7 depicts an illustrative embodiment of a method in accordance with aspects of this disclosure.

Referring now to FIG. 7, a flowchart of an exemplary method 700 in accordance with aspects of this disclosure is shown. The method 700 may be partially or wholly executed by one or more systems, devices, and/or components, such as for example the systems, devices, and components described herein. The method 700 may be utilized to transfer charge from a power supply to an output, wherein the output may, in turn, be used to drive one or more loads.

In block 704, one or more parameters associated with an application or environment may be identified or determined. For example, the parameters identified in block 704 may include an indication of a power supply voltage that is available, a load that is to be driven, packaging space that is available, etc.

In block 708, a number of stages for a charge pump circuit (see FIG. 3: circuit 300) may be identified. The number of stages may be based at least in part on the identifications/determinations of block 704. In various embodiments, the number of stages may be in a range of 2 to 10, although more or fewer stages may be identified, as well.

In block 712, one or more circuits may be fabricated/manufactured to incorporate charge pump functionality. For example, as part of block 712, a charge pump circuit may be manufactured based on the number of stages identified as part of block 708. As part of block 712, additional circuits/circuitry (see, e.g., FIGS. 4-5: circuits 400-500) may be manufactured to generate control signals that may be utilized by the charge pump circuit.

In block 716, one or more of the control signals may be generated to transfer charge from the power supply to the output of the charge pump circuit. The generation of block 716 may include monitoring the output to confirm that the output remains within a respective band/tolerance (see, e.g., FIGS. 3 and 5: comparator U1 501 monitoring the output Pump_out 310 relative to reference voltage vref 565, and shutting off the Clock Input 571 to the clock generator U6 506 when, e.g., the Pump_out 310 voltage (or more specifically, the fraction of the voltage of Pump_out 310 established by the resistors R25 525 and R26 526 as provided to the comparator U1 501) exceeds the reference voltage vref 565).

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As set forth herein, aspects of this disclosure represent significant improvements relative to conventional technologies. To demonstrate, and with reference to FIG. 3 (see also FIG. 6B), the diodes D4 326 and D5 328 increase the response time of a charge pump circuit (see, e.g., charge pump circuit 300 of FIG. 3) in terms of an availability of charge available at an output (e.g., Pump_out 310) of the charge pump circuit to drive a load (e.g., Iload 314). Such an enhanced response time is obtained, while at the same time reducing the number of stages that are needed for a given source power supply (e.g., power supply 308). Still further, components that are utilized as part of the charge pump circuit may be rated for operation at a voltage that is less than the source power supply without compromising reliability or functionality. As described above with respect to FIG. 4 (see transistors MN9' 420 and MN9_2 470), the use of an always-on current tail/sink ensures continuity in current in respect of other transistors (e.g., transistors MN5' 432, MN6' 434, MN5_2 482, and MN6_2 484), thereby promoting stability/reliability in respect of the other transistors.

Aspects of this disclosure, inclusive of aspects associated with a charge pump circuit, may be applied in respect of one or more applications or environments. For example, aspects of this disclosure may be applied in respect of general-purpose analog and digital circuits, high-speed interfaces (e.g., high-speed communications interfaces), analog switches, etc.

As shown in the various drawing figures (e.g., FIGS. 3-5), a first component (or a terminal thereof) may be connected to a second component (or a terminal thereof). In this regard, the first and second components may be directly connected to one another. In some instances, components (or associated terminals) may be connected to one another indirectly, such as for example via another intervening component. In this regard, as used herein a coupling of two components or entities may refer to a direct connection between the components/entities or an indirect connection between the components/entities.

FIG. 1 depicts an exemplary diagrammatic representation of a machine in the form of a computer system 100 within which a set of instructions, when executed, may cause the machine to perform any one or more of the methodologies discussed above. For example, the machine may be used to drive/provide one or more signals, such as for example the reference voltage vref 565, the main clock 569, the en_cp signal 563, the enfullbias signal 427, the enfullbia_b signal 429 shown in FIGS. 4-5. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 100 may include a processor 102 (e.g., a central processing unit (CPU), a graphics processing unit (GPU, or both), a main memory 104 and a static memory 106, which communicate with each other via a bus 108. The computer system 100 may further include a video display unit 110 (e.g., a liquid crystal display (LCD), a flat panel, a solid state display, or a cathode ray tube (CRT)). The computer system 100 may include an input device 112 (e.g., a keyboard), a cursor control device 114 (e.g., a mouse), a disk drive unit 116, a signal generation device 118 (e.g., a speaker or remote control) and a network interface device 120.

The disk drive unit 116 may include a machine-readable medium 122 on which is stored one or more sets of instructions (e.g., software 124) embodying any one or more of the methodologies or functions described herein, including those methods illustrated above. The instructions 124 may also reside, completely or at least partially, within the main memory 104, the static memory 106, and/or within the processor 102 during execution thereof by the computer system 100. The main memory 104 and the processor 102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 122 containing instructions 124, or that which receives and executes instructions 124 from a propagated signal so that a device connected to a network environment 126 can send or receive voice, video or data, and to communicate over the network 126 using the instructions 124. The instructions 124 may further be transmitted or received over a network 126 via the network interface device 120.

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored. A machine-readable medium of this disclosure may include a transitory medium and/or a non-transitory medium. A non-transitory medium may be capable of storing or encoding a set of instructions for execution by a machine that cause the machine to perform any one or more of the methods of the subject disclosure. The term "non-transitory", as in a non-transitory computer-readable storage medium, includes without limitation memories, drives, devices and anything tangible, but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit (ASIC) or field programmable gate array (FPGA). Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. For example, components and/or steps from different embodiments may be combined. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a first diode;
    a second diode;
    a first stage circuit that is coupled to an output of a power supply via at least the first diode, wherein the power supply provides power to the device at a first voltage level, wherein the first stage circuit comprises a first plurality of transistors arranged sequentially between the output of the power supply and a reference corresponding to ground;
    a second stage circuit that is coupled to the first stage circuit via at least the second diode;
    a third diode that couples the second stage circuit to an output of the device, wherein the output of the device provides power to a load at a second voltage level that is greater than the first voltage level;
    a fourth diode that couples the output of the power supply to the second stage circuit; and
    a fifth diode that couples the output of the power supply to the output of the device.

2. The device of claim 1, wherein each of the first plurality of transistors comprises a first plurality of terminals, and wherein a voltage that is applied across any two terminals of the first plurality of terminals is less than the first voltage level.

3. The device of claim 2, wherein the voltage that is applied across any two of the first plurality of terminals is less than or equal to half of the first voltage level.

4. The device of claim 3, wherein the first voltage level is equal to 5 Volts plus or minus 5%.

5. The device of claim 1, further comprising:
    a drive circuit that generates a first drive signal and a second drive signal, wherein the first drive signal is coupled to the first stage circuit and the second drive signal is coupled to the second stage circuit.

6. The device of claim 5, wherein the drive circuit comprises a first plurality of transistors, wherein a first terminal of a first transistor of the first plurality of transistors provides the first drive signal, wherein a second terminal of the first transistor is coupled to a first terminal of a second transistor of the first plurality of transistors, and wherein the second terminal of the first transistor is coupled to a first terminal of a third transistor of the first plurality of transistors.

7. The device of claim 6, wherein the second transistor is off during a first time period corresponding to a transfer of charge from the output of the power supply to a first capacitor of the first stage circuit, and wherein the second transistor is on during a second time period that is subsequent to the first time period.

8. The device of claim 7, wherein the third transistor is on during the first time period and the second time period.

9. The device of claim 8, wherein during the second time period the first transistor conducts a first level of current, and wherein during the second time period the second transistor conducts a first portion of the first level of current and the third transistor conducts a second portion of the first level of current.

10. The device of claim 9, wherein a ratio of the first portion of the first level of current to the second portion of the first level of current is equal to or greater than 20 to 1.

11. The device of claim 6, wherein the first plurality of transistors comprises a fourth transistor and a fifth transistor, wherein the second terminal of the first transistor is coupled to the first terminal of the second transistor via the fourth transistor, and wherein the second terminal of the first transistor is coupled to the first terminal of the third transistor via the fifth transistor.

12. The device of claim 1, further comprising:
    a comparator configured to compare the second voltage level to a threshold to generate a value.

13. The device of claim 12, further comprising:
    a logic circuit configured to disable a transfer of charge from the power supply to the first stage circuit when the value is a first value and enable the transfer of charge from the power supply to the first stage circuit when the value is a second value.

14. A method, comprising:
    obtaining, by a first circuit of a charge pump circuit, charge sourced from a power supply operative at a first voltage level, wherein the first circuit comprises a first plurality of transistors arranged sequentially between the output of the power supply and a reference corresponding to ground, and wherein each of the first plurality of transistors is rated for operation at an applied voltage that is less than the first voltage level;
    storing the charge in a first capacitor of the first circuit at a first point in time;
    transferring the charge stored in the first capacitor to a second capacitor of a second circuit of the charge pump circuit at a second point in time such that the second capacitor stores the charge, wherein the second point in time is subsequent to the first point in time;
    transferring the charge sourced from the power supply to the second capacitor via a first diode that is coupled to the power supply and the second capacitor;
    transferring a second charge stored in the second capacitor to a third capacitor of the charge pump circuit at a third point in time that is subsequent to the second point in time, wherein a terminal of the third capacitor is coupled to a load that is driven by the charge pump circuit; and
    transferring a third charge sourced from the power supply to the third capacitor via a second diode that is coupled to the power supply and the third capacitor.

15. The method of claim 14, further comprising:
    wherein the second circuit comprises a second plurality of transistors, and wherein each of the second plurality of transistors is rated for operation at an applied voltage that is less than the first voltage level.

* * * * *